United States Patent Office 2,795,267
Patented June 11, 1957

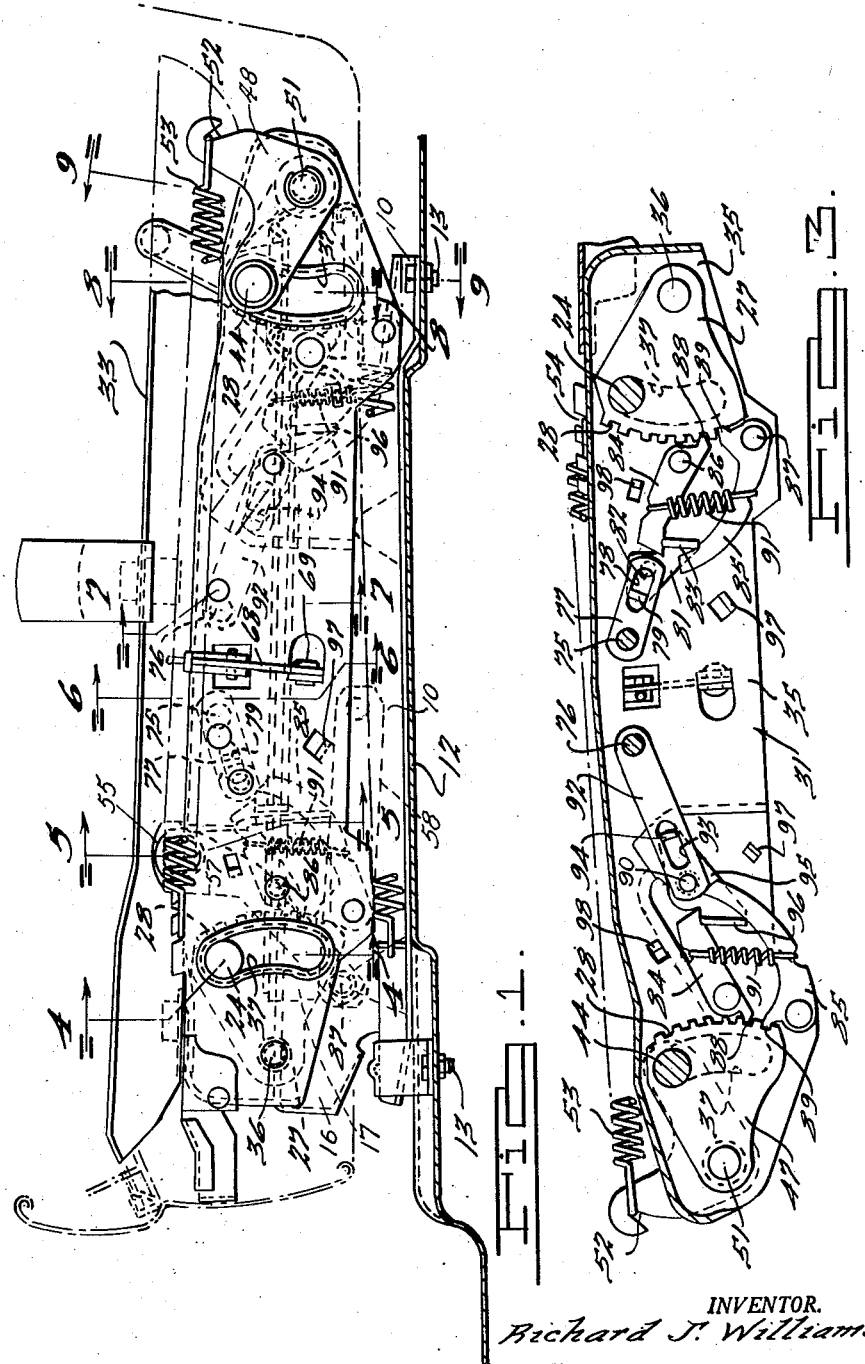

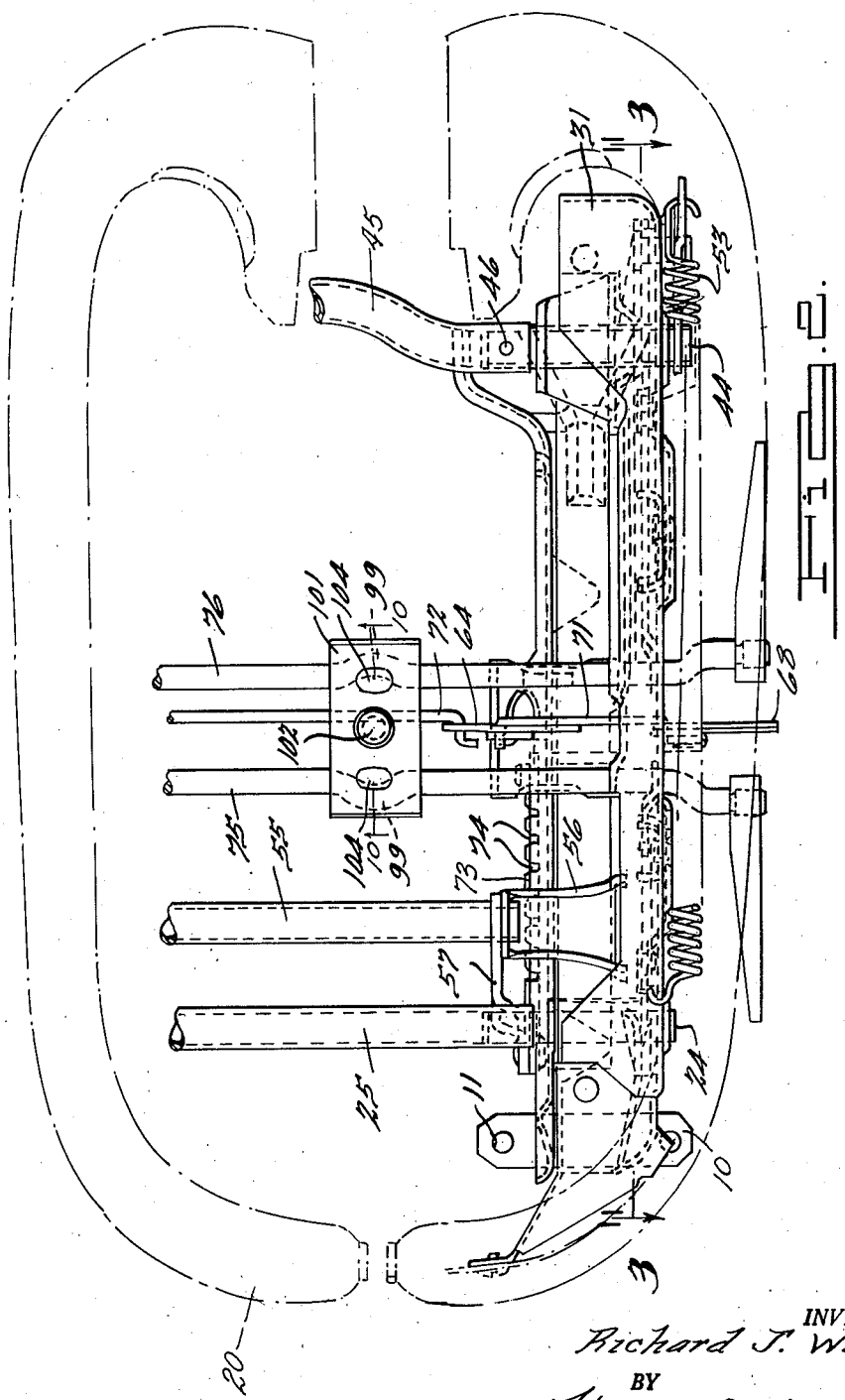

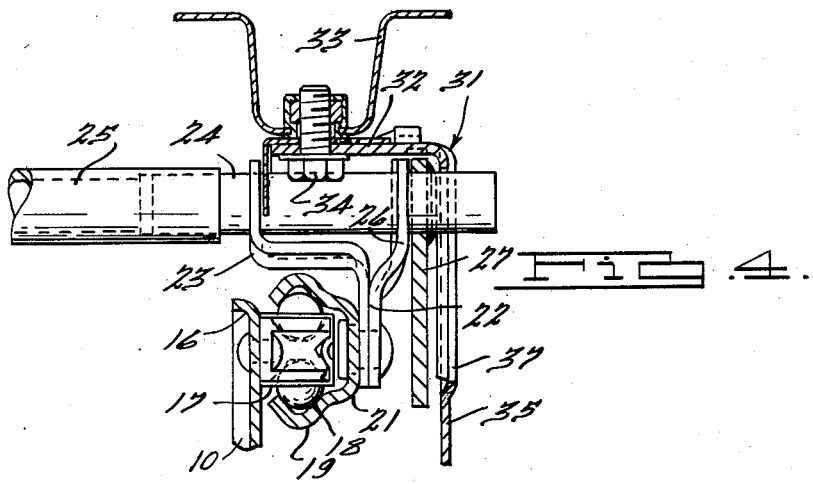
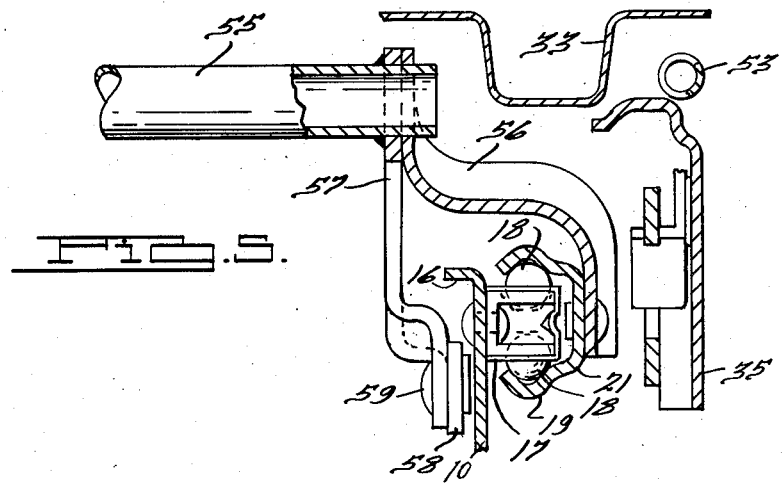
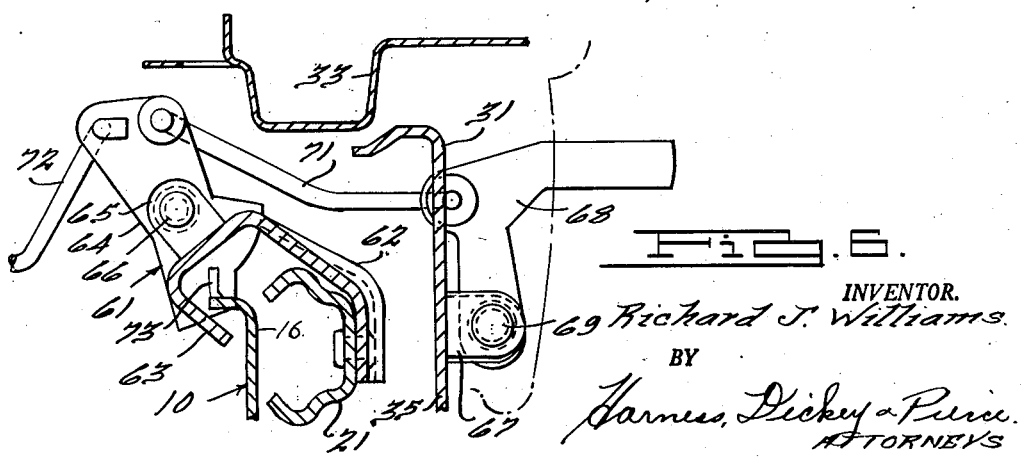

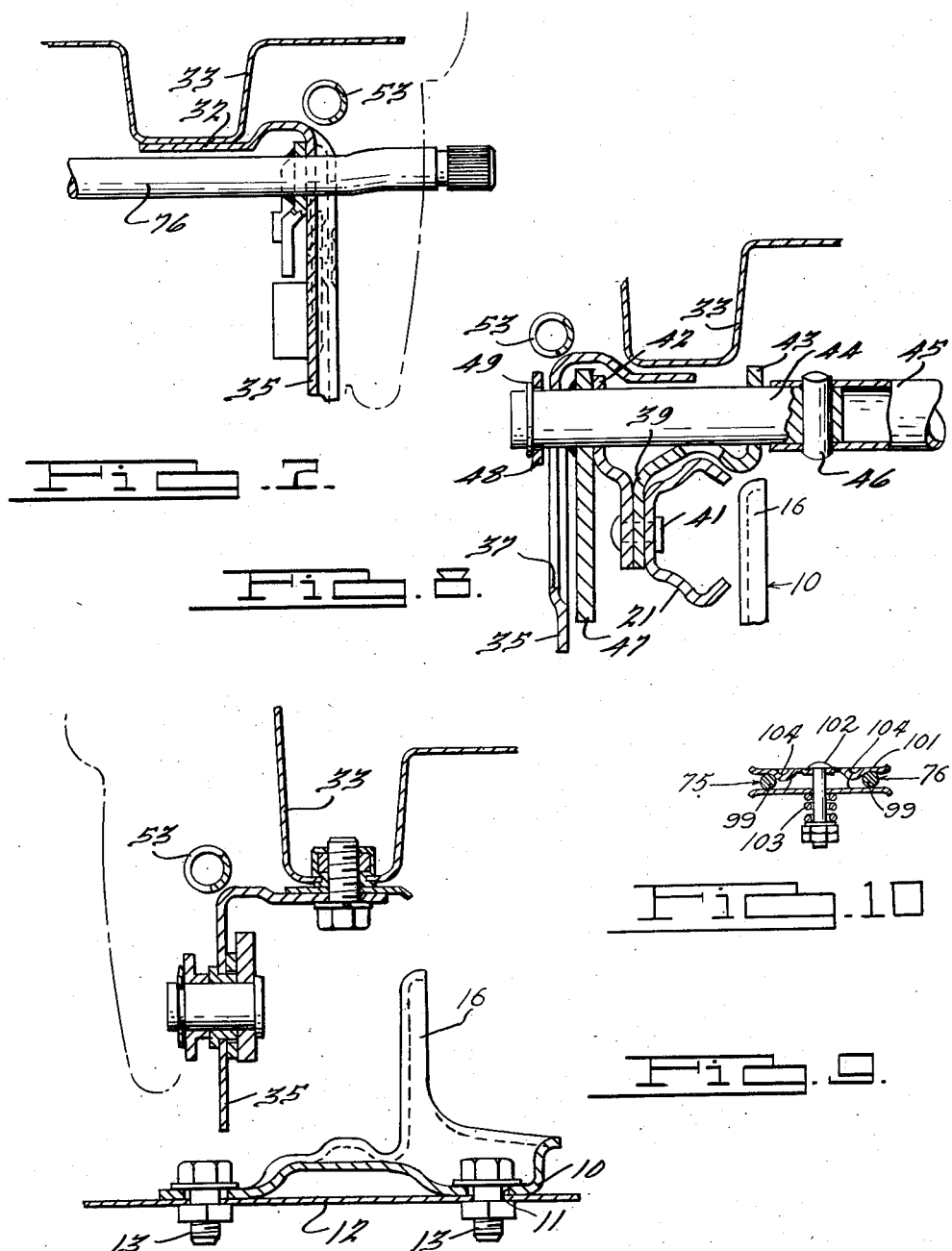

2,795,267
LEVER CONTROL FOR VERTICALLY ADJUSTABLE SEAT

Richard J. Williams, Birmingham, Mich., assignor to American Metal Products Company, Detroit, Mich., a corporation of Michigan Application October 23, 1954, Serial No. 465,196

14 Claims. (Cl. 155—90)

This invention relates to seat supporting mechanisms, and particularly to the control mechanism therefor by which the seat may be locked in raised and lowered positions.

In the patent to A. H. Haberstump, No. 2,609,029, issued September 2, 1952, and assigned to the assignee of the present invention, a seat construction is illustrated wherein the seat is suported on a mechanism for movement backwardly and forwardly and also for tilting movement upwardly and downwardly at either end. The tilting movement is produced by releasing the latch control mechanism, and by shifting the weight on the seat, either the front or the rear end thereof may be adjusted upwardly or downwardly a desired amount. In this arrangement a control handle was employed which could be actuated to release the latching mechanism at the front or the back for either upward or downward adjustment of the seat.

The present invention pertains to a latch control mechanism for the front and rear ends of the seat which are independently actuated by individual handles so that when the front end is to be raised the front handle is raised; when it is to be lowered the front handle is lowered. The same is true of the rear handle. When pulled upwardly the latch is released permitting upward adjustment of the rear end, and when pulled downwardly the latch is released to permit the downward adjustment of the rear end of the seat.

The latch control mechanisms are of the ratchet type which prevents the reverse movement of the seat when the handle has been moved for adjustment in one direction. Thus if the rear handle is moved downwardly to procure the downward movement of the rear edge of the seat, the rear edge cannot rebound upwardly so long as the handle is retained in downward position. To obtain upward adjustment the rear handle must be moved upward and when in this position the rear end of the seat cannot be moved downwardly even though the weight of the occupant is suddenly applied thereto due to the ratcheting features of the mechanisms.

Accordingly, the main objects of the invention are: to provide a seat which may be adjusted upwardly and downwardly at each end independently, with a pair of handles one of which controls the latch mechanism at the front of the seat, the other of which controls the latch mechanism at the rear of the seat; to provide a handle for controlling the latching mechanism for the raising and lowering of the front end of the seat which releases the latch portion for raising the seat and provides a ratchet arrangement which prevents the downward movement thereof when the handle is pulled upwardly and which releases the latch portion for lowering the rear portion of the seat with the ratchet arrangement preventing upward movement thereof when the handle is pushed downwardly; to provide a handle for controlling the latching mechanism of the rear portion of the seat which, when raised, releases the latching mechanism and maintains a ratcheting arrangement which permits the rear portion of the seat to be raised, and when moved downwardly releases the latching mechanism and maintains a ratcheting arrangement which permits the rear portion of the seat to be lowered, and, in general, to provide control handles for the latching and ratcheting mechanisms for the raising and lowering structures at the forward and rear end of the seat which are operated in the direction in which the seat is to be operated while preventing movement in the opposite direction.

Other objects and features of novelty of the invention will be specifically pointed out or will become apparent when referring, for a better understanding of the invention, to the following description taken in conjunction with the accompanying drawings, wherein:

Figure 1 is a view in side elevation of the seat supporting structure embodying features of the present invention;

Fig. 2 is a broken plan view of the structure illustrated in Fig. 1;

Fig. 3 is a sectional view of the structure illustrated in Fig. 2, taken on the line 3—3 thereof;

Fig. 4 is an enlarged sectional view of the structure illustrated in Fig. 1, taken on the line 4—4 thereof;

Fig. 5 is an enlarged sectional view of the structure illustrated in Fig. 1, taken on the line 5—5 thereof;

Fig. 6 is an enlarged sectional view of the structure illustrated in Fig. 1, taken on the line 6—6 thereof;

Fig. 7 is an enlarged sectional view of the structure illustrated in Fig. 1, taken on the line 7—7 thereof;

Fig. 8 is an enlarged sectional view of the structure illustrated in Fig. 1, taken on the line 8—8 thereof;

Fig. 9 is an enlarged sectional view of the structure illustrated in Fig. 1, taken on the line 9—9 thereof, and Fig. 10 is a sectional view of the structure illustrated in Fig. 2, taken on the line 10—10 thereof.

Referring to the figures, the seat supporting structure comprises an angle-shaped base support 10 having apertures 11 in the bottom horizontal portion by which the base support is secured to the floor 12 of the vehicle by suitable bolts 13. The upwardly projecting portion 16 of the base support carries spaced blocks 17 having slots therein for confining balls 18 therein for limited travel. The balls are encompassed by arcuate portions 19 of a channel member 21 which is movable on the balls backwardly and forwardly for adjusting the seat forwardly and rearwardly within the vehicle body. The channel member 21 supports a pair of brackets 22 at the forward end having spaced branches 23 and 26 containing apertures for supporting a stub shaft 24. The stub shaft 24 is connected by a torsion tube 25 to the stub shaft 24 on the opposite track member 20, which is similar to the track 21 being described except for being of the opposite hand. The stub shaft 24 has a sector 27 welded thereon at each end to be in fixed relation to and to rotate with the stub shaft. The sectors, as illustrated in Fig. 3, have a plurality of notches 28 in the arcuate periphery thereof. It is to be understood that the control mechanism to be hereinafter described, includes sector 27 on both the left and right-hand sections of the seat supporting structure.

A seat supporting bracket 31 has one flanged portion 32 extending horizontally for supporting the bottom of the seat frame 33 by screws 34. A vertically disposed flange 35 of the angle-shaped bracket 31 has the end of the sector 27 secured thereto by a pivot 36. The flange 35 has an arcuate slot 37 therein through which the stub shaft 24 extends. A similar supporting construction is provided on the rear end of the track mechanism. A stub shaft 44 is supported in the bracket 39 which is secured by rivets 41 to the channel track member 21. The two branches 42 and 43 have apertures therein through which a stub shaft 44 extends, the stub shafts 44 on both sides of the seat being interconnected by a torsion tube 45 secured thereto by pins 46. A toothed sector 47 is welded to the stub shaft, while a bell crank lever 48 is retained on the shaft by a snap ring 49. The bell crank lever and the sector 47 are secured to the flange 35 of the seat supporting bracket 31 by a pivot 51. The upwardly extending branch of the bell crank lever has a notch 52 therein which receives the end of a coil spring 53 which has its other end hooked over one of a plurality of teeth 54 of the bracket 31 by which the tension on the spring is adjusted. The spring aids in raising the rear end of the seat when the passenger throws his weight forward to permit the angle seat supporting bracket 31 to move upwardly relative to the stub shaft 44. A similar slot 37 is provided in the vertical flange 35 of the seat supporting angle bracket 31 through which the stub shaft 44 extends and which permits the upward and downward movement of the rear end of the flange 35 when the seat is adjusted.

A third torsion rod 55 is supported by brackets 56 on the channel members 21 at each side of the seat supporting structure. An arm 57 is welded or otherwise secured to the torsion bar 55 at both sides of the seat and a link 58 is secured to the end of the arm 57 by a headed rivet 59, while the opposite end of the link 58 is pivoted to the upright portion 16 of the base member 10. The torsion bar 55, when anchored in this manner, causes both sides of the seat to travel backwardly and forwardly without cocking when moved on the balls 18. When moved to a desired position, a latching mechanism 61 secures the seat in forward and rearward adjusted position.

The channel-shaped track member 21 has a bracket 62 thereon which has an inverted U-shaped portion 63 which extends about the upper end of the vertically extending portion 16 of the base member. The U-shaped portions 63 are slotted to receive the latching lever 64 which is pivoted by extending ears 65 on the bracket 62 on a pivot 66. The seat supporting bracket 31 has on the vertical flange portion 35 a struck-out ear 67 to which an operating lever 68 is secured by a pivot 69. A link 71 connects the lever 68 to the latching lever 64. A similar latching lever is provided on the opposite side of the seat structure, which is connected by a rod 72 to the latching lever 64 on the opposite side of the seat for the purpose of operating both of the latching levers 64 simultaneously when the operating lever 68 is actuated. The upper end of the portion 16 is flanged upwardly at 73 and it and the horizontal portion are slotted at 74, as illustrated in Fig. 2, for receiving the end of the lever 64 in one of the plurality of slots, to thereby retain the channel-shaped track member 21 at each side of the seat supporting structure positively latched to the base member 10 in the longitudinally adjusted position of the seat.

With such construction, when the sectors 27 and 47 have the notches released, the seat may be adjusted upwardly at the front end by applying a rearward force on the back cushion of the seat or lowered by moving the weight forwardly. Similarly, the rear of the seat may be raised by raising the weight therefrom, permitting the springs 53 to cause the seat to move upwardly, and the seat may be adjusted downwardly when the weight is applied thereto.

The control mechanism for latching the seat in adjusted position embodies a pair of rods 75 and 76 which pass through apertures in the vertical flange portion of the seat supporting brackets 31. A link 77 is secured to each end of the forward rod 75. Each link 77 has a slot 78 therein in which a laterally projecting end 79 of a lever 81 extends. The lever 81 is secured to the vertical flange 35 by a pivot pin 82. An outwardly extending finger 83 is bent from the end of the lever 81 and disposed in engagement with latching fingers 84 and 85. The finger 84 is secured by a pivot 86 to the flange 35, while a pivot 87 secures the finger 85 to the flange. The finger 84 has a nib 88 adjacent to the pivot which extends within the notch 28 of the sector, while the finger 85 has a nib 89 which in like manner extends within a notch 28. A spring 91 secured to outwardly extending arms of the fingers 84 and 85 draws the arms toward each other, urging the nibs 88 and 89 into the notches. The nibs are so shaped as to act as ratchets so that when the nib 88 on the finger 84 is withdrawn to permit the sector to move in one direction, the nib 89 on the finger 85 functions as a ratchet to prevent the sector to move in the opposite direction. The reverse is also true. The nib 88 on the arm 84 functions as a ratchet, preventing the reverse movement of the sector when the nib 89 of the finger 85 is withdrawn from the notch thereof to permit movement in one direction. When, as illustrated in Fig. 3, the rod 75 is rotated clockwise by the upward movement of a handle on the end of the rod, indicating that the front of the seat is to be raised, the fingers 84 and 85 are rotated in a clockwise direction, thereby releasing the nib 89 from the notch 28 and permitting the seat supporting bracket 31 to move upwardly relative to the stub shaft 44 which rotates with the sector 27 counterclockwise permitting the teeth between the notches thereof to ratchet over the nib 88 which prevents the downward movement of the bracket. When the front of the seat is to be lowered, the downward movement of the handle causes the counterclockwise movement of the rod 75, the upward movement of the finger 83, as well as the fingers 84 and 85, thereby releasing the nib 88 which permits the bracket 31 to move downwardly and the teeth of the sector to ratchet over the nib 89 which prevents the upward movement of the bracket. After adjustment is made in this manner and the handle released, both of the nibs enter the notches, as illustrated in Fig. 3, and retain the front end of the seat in adjusted position against both upward and downward movement.

Similarly, at the rear of the seat, the rod 76 has a link 92 secured thereon, having a slot 93 which receives a finger 94 of a link 95 which is secured to the flange 35 by a pivot 90. The opposite end of the link 95 has a finger 96 which projects between two fingers 84 and 85, the same as on the front end of the seat supporting bracket 31. The spring 91 pulls the two fingers toward each other and the end nibs 88 and 89 project within notches 28 on the arcuate edge of the sector 47. When a handle on the end of the rod 76 is moved upwardly, indicating that the rear end of the seat is to be adjusted upwardly, the fingers 84 and 85 are rotated in a counterclockwise direction, withdrawing the nib 89 from the notch and permitting the seat supporting bracket 31 to move upwardly relative to the sector 47 and permitting the nib 88 to ratchet over the teeth between the notches and preventing the bracket from moving downwardly. After adjustment has been made, the release of the handle causes the nib 89 to move into the adjacent notch, thereby again locking the rear end of the seat against upward and downward movement. In case the rear edge of the seat is to be lowered, the handle is moved downwardly, thereby rocking the fingers 84 and 85 clockwise, withdrawing the nib 88 from a notch 28, thereby permitting the seat supporting bracket 31 to move downwardly relative to the sector 47 and permitting the nib 89 to ratchet over the teeth between the notches 28 until the desired amount of lowering has been attained, the nib 89 preventing the upward movement of the bracket. Thereafter, the release of the handle permits the nibs 88 and 89 to move in adjacent notches and thereby lock the rear end of the seat against upward or downward movement. Stop members 97 and 98 may be struck from the vertical flange portion 35 of the seat supporting bracket 31 for limiting the degree of movement of the levers 84 and 85.

Referring to Fig. 2, it will be noted that each of the rods 75 and 76 has a crank 99 therein which is engaged between a pair of straps 101 secured together by a bolt 102, having a coil spring 103 thereabout which produces a tension on the straps and causes the cranks to return to planar position with each other, with the handles on the ends of the rods disposed in a horizontal plane after each operation. Downwardly extending projections 104 at the crank portions retain the assembled straps against movement longitudinally along the rods.

With this construction, a seat supporting mechanism is provided on which the seat may be adjusted forwardly and rearwardly and on which each end of the seat may be raised and lowered independently of the other end. The control for the raising and lowering of the seat employs similar mechanisms at the front and rear portions of the seat supporting brackets at both sides of the assembly. The brackets are raised and lowered relative to the torsion bars extending across the supporting structure, permitting the independent upward or downward movement of the forward and rear ends of the seat. Notched sectors are secured to the torsion bars and are pivoted to the seat supporting bracket so that the bracket may move upwardly and downwardly relative to the torsion bars as the torsion bars and sectors are rotated. A pair of control handles is provided at one side of the seat assembly, so constructed that when either the front or rear of the seat is raised, either the front or back handle is raised, or is lowered when the front or rear of the seat is to be lowered. The handles operate a pair of fingers having nibs thereon which engage in the notches of the sector so that when the handle is moved in one direction one of the fingers is moved to release a nib from the notch, permitting the movement of the seat in the direction in which the handle was moved. This result obtains both for the front and rear latching mechanism and any confusion with regard to how the latching mechanism is to be operated is avoided by the use of the two handles, one for the front mechanism, the other for the rear mechanism. If the front end of the seat is to be raised, the front handle is raised, and lowered if the front end of the seat is to be lowered. If the rear of the seat is to be raised, the rear handle is raised and lowered if the rear edge of the seat is to be lowered. This movement is positive since when one nib is released the other functions as a ratchet to prevent the movement of the seat in the direction opposite to that in which it is to be moved.

What is claimed is:

1. In a seat supporting structure, a mechanism at each side of the seat, each mechanism having a bracket which is tiltable so that either the forward or rearward end may be raised and lowered independently of the other and a base support on which the bracket is tilted, control devices for locking said ends in adjusted position, said devices including two notched sectors, one pivoted at the forward, the other at the rear end of each bracket, pairs of latching fingers near each end of said brackets having nibs engaging notches in said sectors, levers on said brackets having projecting ends, one of said ends extending between said fingers, front and rear rods extending across the mechanisms, links on the ends of each of said rods engaging the other ends on said levers, and handles on said rods whereby when a handle is raised on either the front or rear rod the front or rear end of the brackets may be raised on the base supports while being retained against downward movement and when the handle is lowered either the front or rear end of the brackets may be lowered on said base supports while being retained against upward movement.

2. In a seat supporting structure, a mechanism at each side of the seat, each mechanism having a bracket which is tiltable so that either the forward or rearward end may be raised and lowered independently of the other and a base support on which the bracket is tilted, control devices for locking said ends in adjusted position, said devices including two notched sectors, one pivoted at the forward, the other at the rear end of each bracket, pairs of latching fingers near each end of said brackets having nibs engaging notches in said sectors, levers on said brackets having projecting ends, one of said ends extending between said fingers, front and rear rods extending across the mechanisms, links on the ends of each of said rods engaging the other ends on said levers, handles on said rods whereby when a handle is raised on either the front or rear rod the front or rear end of the brackets may be raised on said base supports while being retained against downward movement and when the handle is lowered either the front or rear end of the brackets may be lowered on said base supports while being retained against upward movement, said rods having crank portions, and spring pressed plates retaining said portions in planar relation between the plates when the handles are released.

3. In a seat construction, a pair of spaced base supports, vertically movable seat supporting brackets on said supports, torsion bars pivotally supported on said base supports and disposed therebetween, notched sectors secured to the ends of said torsion bars and pivoted to said brackets, pairs of fingers pivoted on said brackets one adjacent each sector, said fingers having nibs thereon engaged with the notches in the sectors in ratchet relation therewith in opposite direction of latching, levers pivoted to said brackets having outwardly projecting tongues at the ends thereof, one of said tongues extending between each pair of fingers, springs engaging each pair of said fingers for maintaining the confronting edges thereof in engagement with one of said tongues, rods pivotally supported on said brackets and disposed therebetween, and links connected to said rods at the ends thereof in engagement with the other tongue of said levers whereby when said links are moved a nib is withdrawn from a notch permitting adjustment in one direction while the other nib over which the notches ratchet prevents movement in the opposite direction.

4. In a seat construction, a pair of spaced base supports, vertically movable brackets on said supports on which a seat may be supported, torsion bars pivotally supported on said base supports and disposed therebetween, notched sectors secured to the ends of said torsion bars and pivoted to said brackets, pairs of fingers pivoted on said brackets one adjacent each sector, said fingers having nibs thereon engaged with the notches in the sectors, levers pivoted to said bracket having outwardly projecting tongues at the ends thereof, one of said tongues extending between each pair of fingers, springs engaging each pair of said fingers for maintaining the confronting edges thereof in engagement with said tongues, front and rear rods pivotally supported on said brackets and disposed therebetween, links connected to said rods at each end thereof in engagement with the other tongue of said levers, and handles on each of said rods at one end thereof whereby the raising of the front handle permits the operator to raise the front end of the brackets and the lowering of the handle permits the operator to lower the front end of the bracket, and the raising of the rear handle permits the operator to raise the rear end of the brackets, and the lowering of the rear handle permits the operator to lower the rear end of the brackets.

5. In a seat construction, a pair of spaced base supports, a vertically movable seat supporting bracket on each said support, torsion bars pivotally supported on said base supports and disposed therebetween, notched sectors secured to the ends of said torsion bars and pivoted to said brackets, latching means associated with each of said sectors in ratchet relation with the notches thereof, front and rear handles extending from one of said brackets for actuating said latching means whereby when the forward or rearward handle is raised either the forward or rearward end of the brackets may be raised and when either the forward or rearward handle is lowered either the forward or rearward end of the brackets may be lowered while said ends are retained against movement in the opposite direction.

6. In a seat construction, spaced base supporting means, mechanism supported thereby in a manner to permit each end to be raised or lowered independently of the other, said mechanism having sectors at the forward and rearward ends thereof, said sectors having notches in the arcuate ends thereof, latching means engageable with said notches adjacent each of said sectors in ratchet relation with the notches thereof, a pair of rotatably mounted rods on said mechanism, a handle on each of said rods, and links on said rods actuating said latching means so arranged that when either handle on the front or rear rod is raised the front or rear end of the mechanism may be raised and when either handle on the front or rear rod is lowered either the front or rear end of the mechanism may be lowered while said ends are retained against movement in the opposite direction.

7. In a seat construction, spaced base supporting means, mechanisms supported thereby in a manner to permit each end to be raised or lowered independently of the other, said mechanisms having sectors at the forward and rearward ends thereof, said sectors having notches in the arcuate ends thereof, latching means engageable with said notches adjacent each of said sectors in ratchet relation therewith, front and rear rods pivoted between said mechanism, a handle on the end of each rod, a link on each rod for actuating said latching means so arranged that when the handle on either the front or rear rod is raised the front or rear end of the mechanisms may be raised and when the handle on either the front or rear rod is lowered either the front or rear end of the mechanisms may be lowered while said ends are retained against movement in the opposite direction, and means for supporting said mechanisms on said base elements for movement longitudinally thereof.

8. In a seat supporting structure, a pair of spaced base members, vertically movable brackets on said members, rotatable torsion bars extending between said base members and supported thereby, notched sectors secured to the ends of said torsion bars and pivoted to said brackets, pairs of fingers having nibs thereon pivoted on said brackets adjacent to each of said sectors in ratchet relation with the notches thereof, arms pivoted on said brackets, and means operatively connecting the arms to said pairs of fingers.

9. In a seat supporting structure, a pair of spaced base members, vertically movable brackets on said members, rotatable torsion bars extending between said base members and supported thereby, notched sectors secured to the ends of said torsion bars and pivoted to said brackets, pairs of fingers having nibs thereon pivoted on said brackets adjacent to each of said sectors in ratchet relation with the notches thereof, arms pivoted on said brackets and operatively engaging said pairs of fingers, means pivoted on said brackets and operatively engaging the arms, and handles fixed to said pivoted means and disposed substantially in a horizontal plane whereby the raising of the handles permits the associated front or rear end of the brackets to be raised and the lowering of the handles permits the associated front or rear end of the brackets to be lowered while said ends are retained against movement in the opposite direction.

10. In a seat supporting structure, spaced base members, seat supporting brackets, notched sectors pivoted at the forward and rear ends of the base members movably connected to said brackets by which an end of the brackets may be raised and lowered independently of the other, control devices for locking the ends of the brackets in adjusted position, said devices including, pairs of latching fingers pivoted on said brackets, said fingers having nibs engaging notches in said sectors, and levers on said brackets having projecting ends extending between said pairs of fingers, one of said nibs being withdrawn from a notch in the associated sector by the movement of the end of the lever remote from the projecting ends in one direction, permitting said brackets to be moved in said direction while said other nib functions as a ratchet preventing said brackets from moving in the opposite direction.

11. In a locking device, a support, a sector pivoted to said support and having notches in its arcuate edge struck on a radius from said pivot, a pair of latching fingers on said support in ratchet relation with said notches, one said finger preventing the angular movement of said sector in one direction, the other said finger preventing the angular movement in the other direction, and an actuating element on said support having one end extending between said fingers whereby when the extending end of said element is moved in one direction one of the fingers from a notch in the sector permitting the sector to move in one direction while the other finger in ratchet relation with a notch in the sector retains the sector against movement in the opposite direction.

12. In a seat supporting structure, a pair of spaced base members, vertically movable brackets on said members, torsion bars extending between said base members and pivoted thereon, notched sectors secured to one end of said torsion bars and pivoted to said adjacent bracket, a pair of fingers having notches thereon pivoted on said bracket adjacent to each said sector in ratchet relation with the notches thereof, links pivoted on said bracket, means operatively connecting the links to said pair of fingers, and handles fixed to said links and disposed substantially in a horizontal plane whereby the raising of the handles and the release of one of said fingers from ratcheting position permits the associated front or rear end of the brackets to be raised and the lowering of the handles permits the associated front or rear end of the brackets to be lowered while said ends are retained against movement in the opposite direction by the ratcheting of the other of said pair of fingers.

13. In a seat supporting structure, a pair of spaced base members, a vertically movable bracket on each said member, torsion bars extending between the base members and supported thereby for angular movement, notched sectors secured to one end of the torsion bars and pivoted to the adjacent bracket, a pair of fingers having notches thereon pivoted on said bracket adjacent to each of said sectors in ratchet relation with the notches thereof, links pivoted on said bracket, means operatively connecting the links to said pair of fingers for moving the nib of one of the fingers out of engagement with said notches while the other finger remains in ratchet relation therewith, and handles fixed to said links disposed in position to be raised and lowered whereby the raising of a handle releases a finger for permitting one edge of the brackets to be raised while the other finger prevents the lowering thereof, and the lowering of the handle permits one edge of the brackets to be lowered through the release of the nib of one finger while the other finger remains in position to prevent the raising of said edge.

14. In a seat supporting structure, a pair of spaced base members, a vertically movable bracket on each said member, a torsion bar extending between said base members and supported for angular movement therein, a notched sector secured to one end of said torsion bar and pivoted to the adjacent bracket, a pair of fingers having nibs thereon pivoted on said bracket adjacent to said sector with the nibs in ratchet relation with the notches thereof, and means for releasing one of said fingers while the other finger remains in ratcheting position to permit the adjustment of said brackets in one direction while retained against movement in the opposite direction and for releasing said other finger while said one finger remains in ratcheting position to permit the adjustment of said brackets in said opposite direction while retained against movement in said one direction.

References Cited in the file of this patent

UNITED STATES PATENTS

| | | |
|---|---|---|
| 1,699,249 | Provost | Jan. 15, 1929 |
| 2,124,755 | Simpson | July 26, 1938 |
| 2,609,029 | Haberstump | Sept. 2, 1952 |

FOREIGN PATENTS

| | | |
|---|---|---|
| 798,392 | France | Mar. 10, 1936 |